United States Patent
Watson (10) Patent No.: US 9,649,983 B2
(45) Date of Patent: May 16, 2017

(54) COMBINATION RUNNING BOARD AND SIDESTEP HAVING A LINEAR DRIVE

(71) Applicant: Magna International Inc., Aurora (CA)

(72) Inventor: Bradley E. Watson, Barrie (CA)

(73) Assignee: Magna International Inc., Aurora (CA)

( * ) Notice: Subject to any disclaimer, the term of this patent is extended or adjusted under 35 U.S.C. 154(b) by 96 days.

(21) Appl. No.: 14/807,070

(22) Filed: Jul. 23, 2015

(65) Prior Publication Data
US 2016/0023609 A1    Jan. 28, 2016

Related U.S. Application Data

(60) Provisional application No. 62/028,006, filed on Jul. 23, 2014.

(51) Int. Cl.
*B60R 3/02* (2006.01)
*B60R 3/00* (2006.01)

(52) U.S. Cl.
CPC ............... *B60R 3/02* (2013.01); *B60R 3/002* (2013.01)

(58) Field of Classification Search
CPC .................................. B60R 3/02; B60R 3/002
See application file for complete search history.

(56) References Cited

U.S. PATENT DOCUMENTS

| | | | | |
|---|---|---|---|---|
| 3,039,562 A | * | 6/1962 | Wagner | B60R 3/02 182/91 |
| 3,404,581 A | * | 10/1968 | Kraus | F16H 25/2056 74/89.35 |
| 3,608,957 A | * | 9/1971 | Maneck | B60R 3/02 280/166 |
| 3,762,742 A | * | 10/1973 | Bucklen | B60R 3/02 280/166 |
| 3,986,724 A | * | 10/1976 | Rivinius | E02F 9/0833 280/163 |
| 4,020,920 A | * | 5/1977 | Abbott | B60R 3/02 105/445 |
| 4,356,894 A | * | 11/1982 | Everett | B60R 3/02 105/445 |
| 5,605,071 A | * | 2/1997 | Buchanan, Jr. | F16H 1/16 188/134 |

(Continued)

*Primary Examiner* — J. Allen Shriver, II
*Assistant Examiner* — Steve Clemmons
(74) *Attorney, Agent, or Firm* — Warn Partners, P.C.

(57) ABSTRACT

Running board assembly for a motor vehicle having a passenger cab and a box. The running board assembly includes a linear actuator assembly partly disposed within a housing assembly, a running board operably coupled to the linear actuator assembly and movable relative to the housing assembly between a stowed position tucked underneath the vehicle, a cab entry position generally outwardly from the vehicle to support a user entering or exiting the passenger cab, and a box side step disposed generally outwardly from the vehicle and rearward of the cab entry position to provide a user with side access to the box, and a motor operably coupled to the linear actuator assembly for driving the linear actuator assembly in opposing first and second directions. The linear actuator assembly converts rotary input to linear motion to cause a drive arm having a linkage assembly to move the running board between the positions.

24 Claims, 8 Drawing Sheets

(56) References Cited

U.S. PATENT DOCUMENTS

| | | | | |
|---|---|---|---|---|
| 6,325,397 B1* | 12/2001 | Pascoe | ............... | B60R 3/02 280/163 |
| 6,769,527 B1* | 8/2004 | Paris | ............... | F16D 67/02 192/16 |
| 6,942,233 B2* | 9/2005 | Leitner | ............... | B60R 3/02 105/447 |
| 6,955,370 B2* | 10/2005 | Fabiano | ............... | B60R 3/02 280/163 |
| 7,287,771 B2* | 10/2007 | Lee | ............... | B60R 3/02 280/163 |
| 7,318,596 B2* | 1/2008 | Scheuring, III | ............... | B60R 3/02 280/163 |
| 7,513,520 B2* | 4/2009 | Okuyama | ............... | B60R 3/02 280/166 |
| 7,513,565 B2* | 4/2009 | Watson | ............... | B60R 3/02 280/163 |
| 7,823,896 B2* | 11/2010 | VanBelle | ............... | B60R 3/02 280/163 |
| 8,240,222 B2* | 8/2012 | Yoshioka | ............... | F16H 25/2223 74/424.75 |
| 8,297,635 B2* | 10/2012 | Agoncillo | ............... | B60R 3/02 280/163 |
| 8,342,551 B2 | 1/2013 | Watson | | |
| 8,668,217 B2* | 3/2014 | Ziaylek | ............... | B60R 3/02 280/163 |
| 8,739,342 B1* | 6/2014 | Johnson | ............... | B66B 9/0869 14/71.3 |
| 8,833,781 B2* | 9/2014 | Hayes | ............... | B60R 3/02 280/163 |
| 8,919,497 B2* | 12/2014 | Rund | ............... | E06C 5/04 182/127 |

* cited by examiner

COMBINATION RUNNING BOARD AND SIDESTEP HAVING A LINEAR DRIVE

CROSS-REFERENCE TO RELATED APPLICATIONS

This application claims the benefit of U.S. Provisional Application No. 62/028,006, filed Jul. 23, 2014. The disclosure of the above application is incorporated herein by reference.

FIELD OF THE INVENTION

The present invention relates to a drive structure for use in an active running board system for automotive applications.

BACKGROUND OF THE INVENTION

The invention relates to a running board assembly for a motor vehicle. More particularly, the invention relates to a running board assembly including a running board movable between a stowed position, a cab entry position, and a box side step position.

SUMMARY OF THE INVENTION

According to one aspect of the invention, a running board assembly is provided for a motor vehicle having a passenger cab and a box. The running board assembly includes a housing assembly, a linear actuator assembly partly disposed within the housing assembly, a running board operably coupled to the linear actuator assembly and movable relative to the housing assembly between a stowed position tucked underneath the motor vehicle, a cab entry position generally outwardly from the motor vehicle to support a user entering or exiting the passenger cab, and a box side step position disposed generally outwardly from the motor vehicle and rearward of the cab entry position to provide a user with side access to the box, and a motor operably coupled to the linear actuator assembly for driving the linear actuator assembly in opposing first and second directions to move the running board between the stowed position, the cab entry position, and the box side step position. The linear actuator assembly converts rotary input to linear motion.

According to another aspect of the invention, a running board assembly for a motor vehicle having a passenger cab and a box includes a housing assembly, a linear actuator assembly partly disposed within the housing assembly, and a running board operably coupled to the linear actuator assembly and movable relative to the housing assembly between a stowed position tucked underneath the motor vehicle, a cab entry position generally outwardly from the motor vehicle to support a user entering or exiting the passenger cab, and a box side step position disposed generally outwardly from the motor vehicle and rearward of the cab entry position to provide a user with side access to the box. The running board assembly also includes a drive arm fixedly secured to the running board and operably coupled to the linear actuator assembly. The drive arm further includes at least a first and second link for moving the drive arm as the linear actuator assembly is actuated. The running board assembly further includes a motor operably coupled to the linear actuator assembly for driving the drive arm to pivotally move the running board between the stowed position, the cab entry position, and the box step side position, and an electronic control unit operably coupled to the motor and programmed to turn off the motor after a predetermined number of armature revolutions to stop the running board in the cab entry position.

In accordance with another embodiment, the drive arm also includes a first stop engageable with the running board to stop the running board in the stowed position and a second stop engageable with the running board to stop the running board in the box step side position.

According to yet another aspect of the invention, a running board assembly for a motor vehicle includes a mounting bracket adapted for attachment to the motor vehicle, a running board movable relative to the mounting bracket between a stowed position tucked underneath the motor vehicle, a cab entry position disposed generally outwardly from the motor vehicle, and a box side step position disposed generally outwardly from the motor vehicle and generally rearward to the cab entry position, a motor operably coupled to the running board for driving movement thereof, and an electronic control unit electronically connected to the motor and programmed to turn off said motor when said running board reaches said cab entry position. The running board assembly also includes a housing assembly including a worm member operably coupled to the motor. The housing assembly includes a zero backlash worm self locking member, to eliminate backlash of the running board when the running board is in the cab entry position, having a worm gear fixedly mounted on an end of a ball screw and a ball nut mounted along the ball screw for movement relative thereto.

BRIEF DESCRIPTION OF THE DRAWINGS

The present invention will become more fully understood from the detailed description and the accompanying drawings, wherein.

DETAILED DESCRIPTION OF THE EXEMPLARY EMBODIMENTS

The following description of the preferred embodiment(s) is merely exemplary in nature and is in no way intended to limit the invention, its application, or uses.

Referring to FIGS. 1-4 and 7 generally, a running board assembly, generally shown at 10, in one embodiment includes a running board 12, a housing assembly 14, a drive arm 16, an idler arm 18, a linear actuator assembly 20, a motor assembly 22, an electronic control unit 24, and at least one mounting bracket 26. The mounting bracket 26 is adapted for attachment to a frame of a motor vehicle 28.

Figure 1:
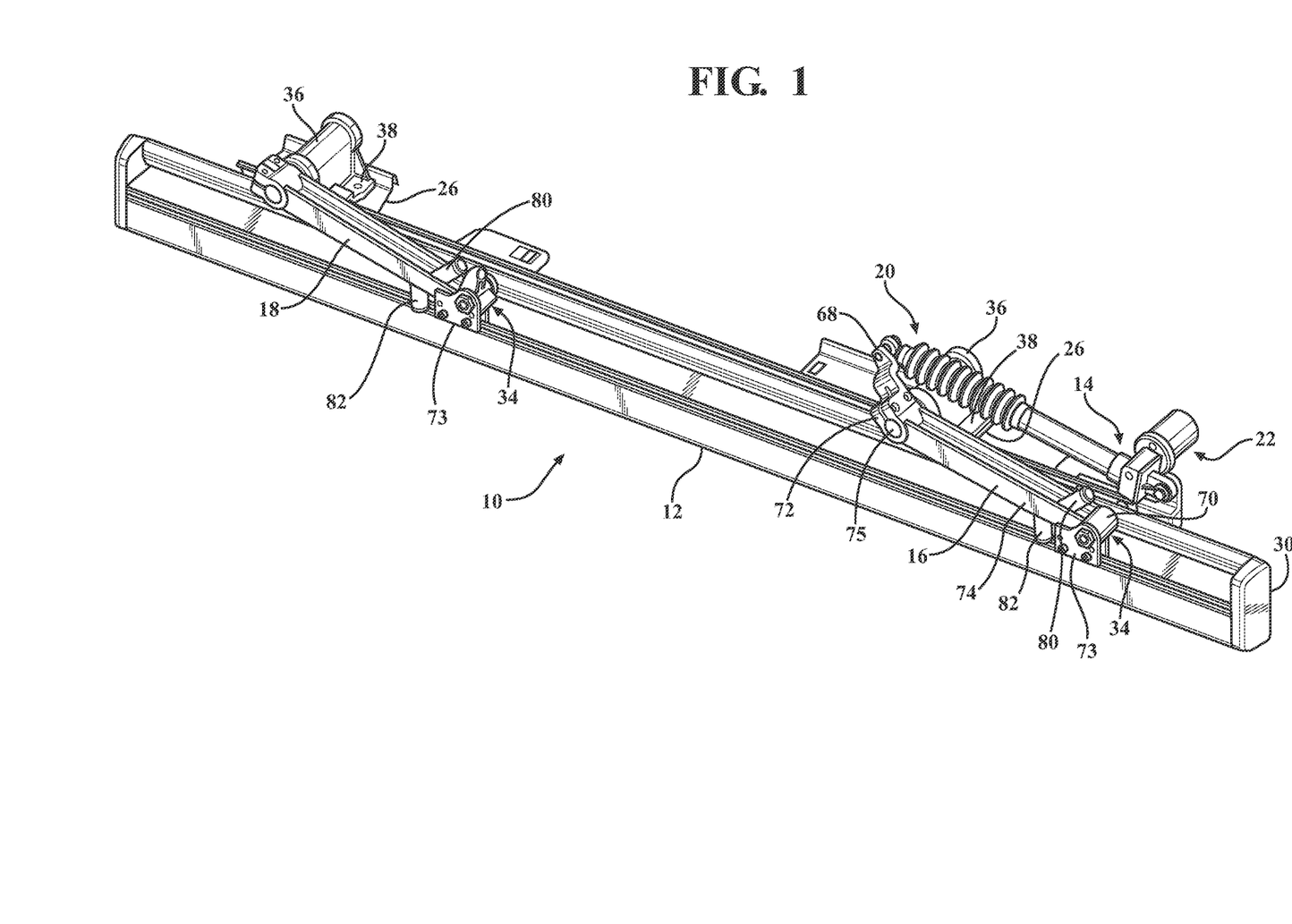
FIG. 1 is a perspective view of one embodiment of a running board assembly including a running board.

The running board 12 has a top wall 30 providing a tread surface 32 therealong. The running board 12 is connected to the drive 16 and idler 18 arms at pivots generally shown at 34. The pivots 34 are arranged generally vertically in vehicle installed position and include a shaft extending through a bore in the end of the drive 16 and idler 18 arms and retained in place by a retaining ring. The idler arm 18 is mounted to a hub structure 36 which pivotally secures the idler arm 18 to a rear bracket 38. The rear bracket 38 is mounted to the mounting bracket 26 which is attached to the frame of the motor vehicle 28. It is appreciated that although a single idler arm 18 is shown, the running board assembly 10 in another embodiment may include more than one idler arm 18.

Figure 2:
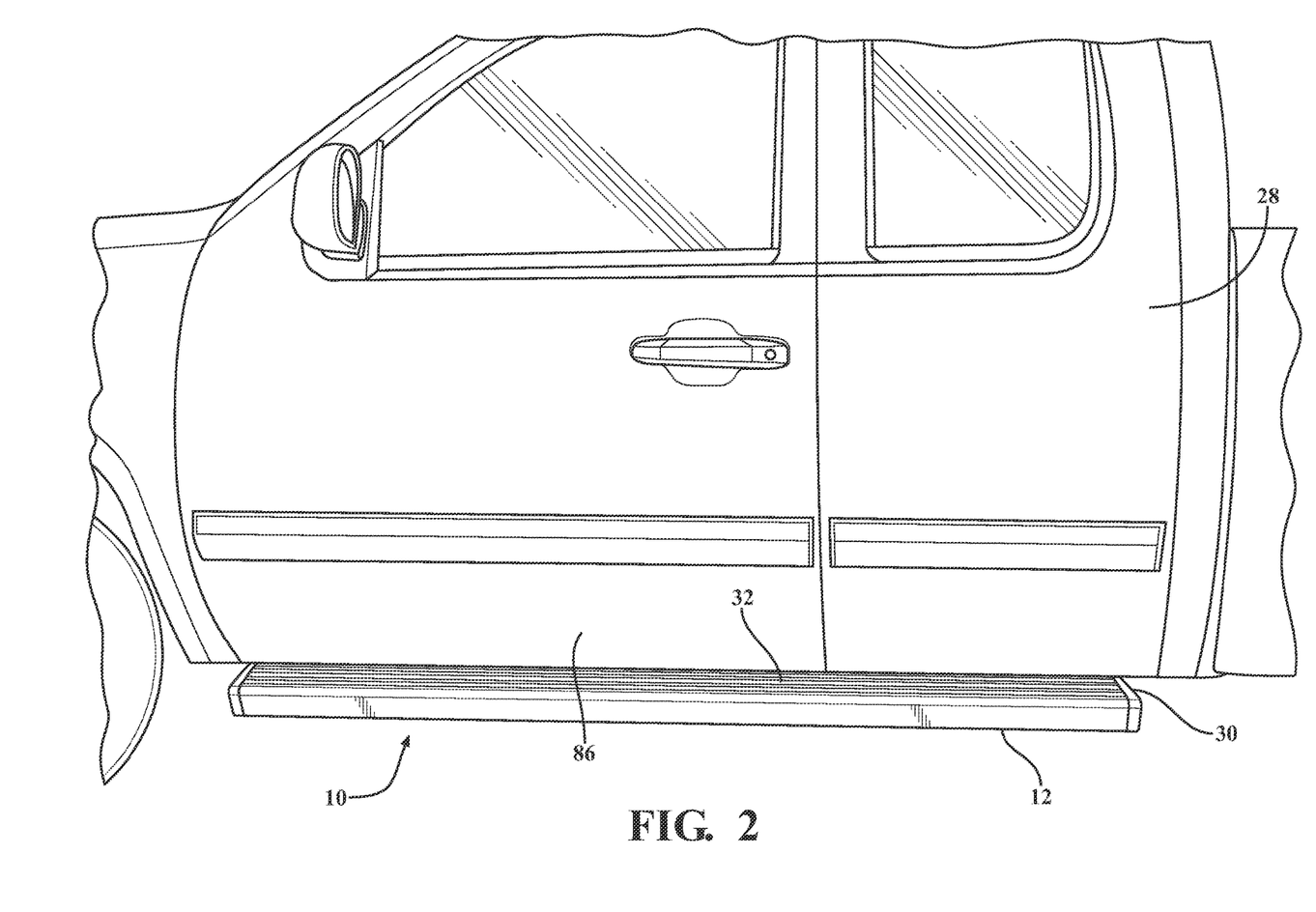
FIG. 2 is a side view of a motor vehicle including the running board in a stowed position.
Figure 3:
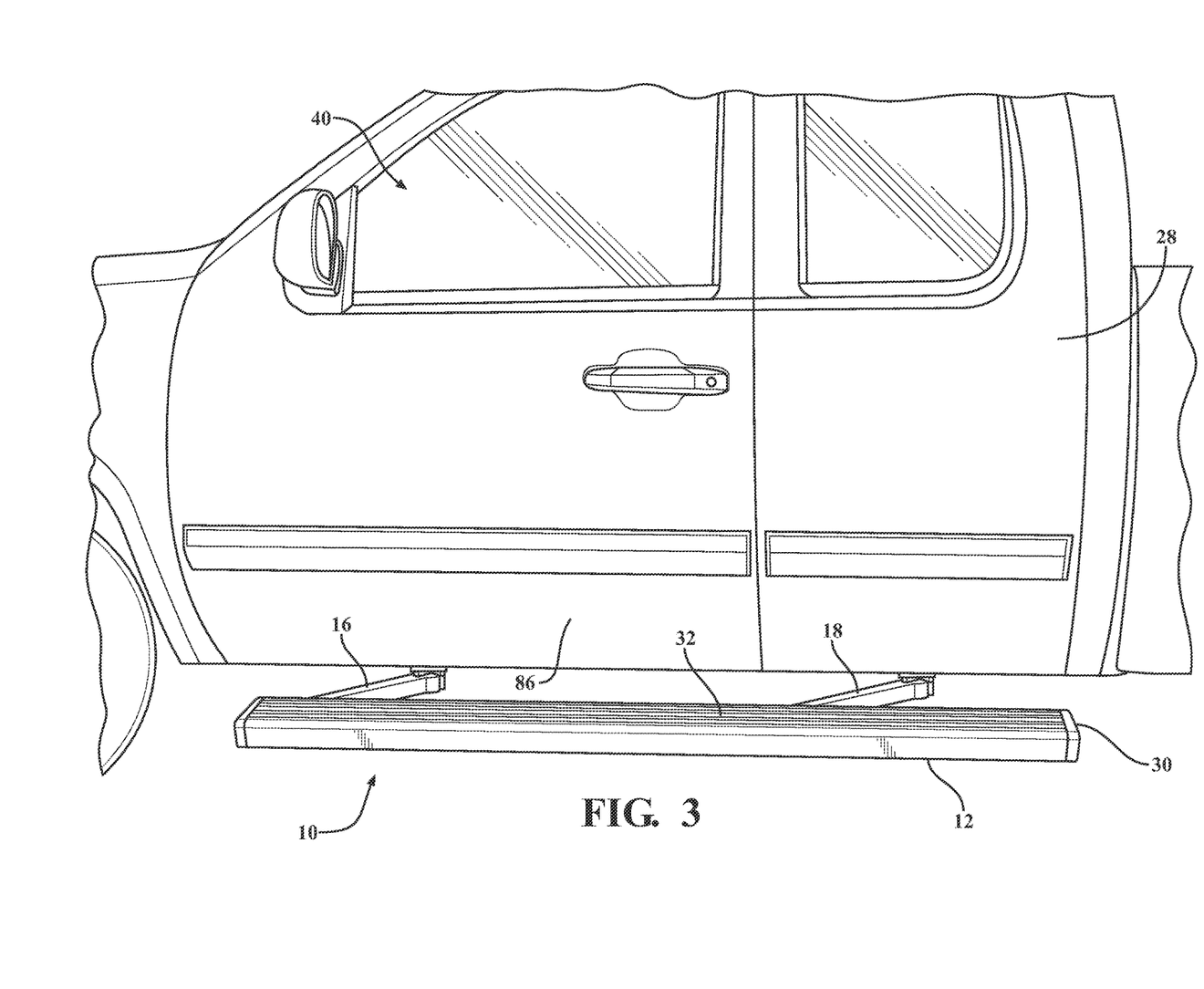
FIG. 3 is a side view of the motor vehicle including the running board in a cab entry position.
Figure 4:
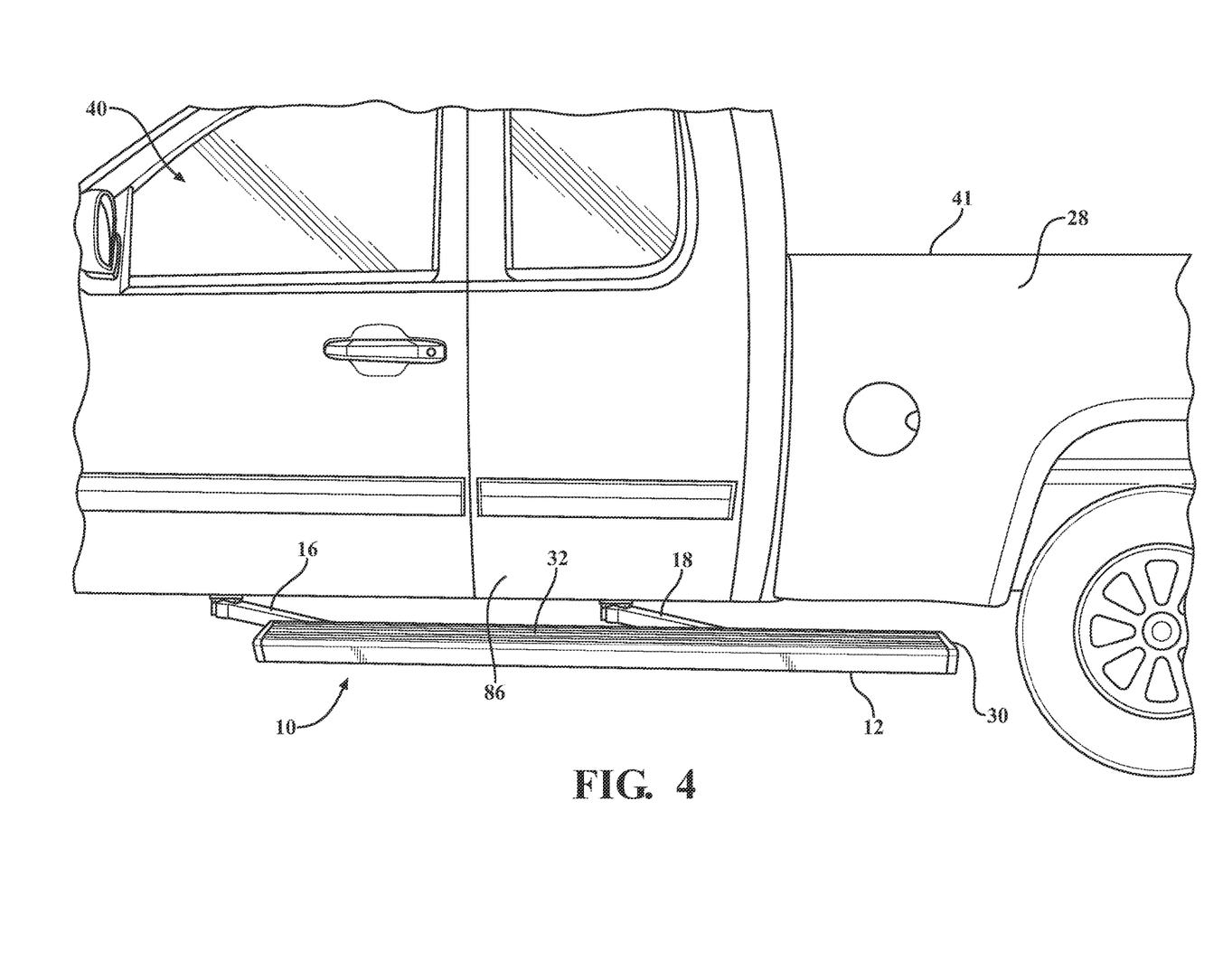
FIG. 4 is a side view of the motor vehicle including the running board in a box side step position.

The drive 16 and idler 18 arms form a parallel linkage which pivotally couples the running board 12 to a frame of the motor vehicle 28 for movement between a stowed position, as shown in FIG. 2, a cab entry position, as shown in FIG. 3, and a box side step position, as shown in FIG. 4. In the stowed position, the running board 12 is horizontal and generally tucked underneath the motor vehicle 28 under the edge of the motor vehicle 28 so as to be somewhat hidden from view and to provide a cleaner, more integrated look to the motor vehicle 28. In the cab entry position, the running board 12 extends generally horizontally outwardly from the motor vehicle 28 to assist users entering or exiting a passenger cab generally indicated at 40. And in the box side step position, the running board 12 extends generally horizontally outwardly from the motor vehicle 28 and is disposed rearward as compared to the cab entry position in order to allow users side access to a box 41 of the motor vehicle 28. The running board 12 provides a more useful step surface with improved step length for box access as compared to a separate frame mounted side step.

Figure 5:
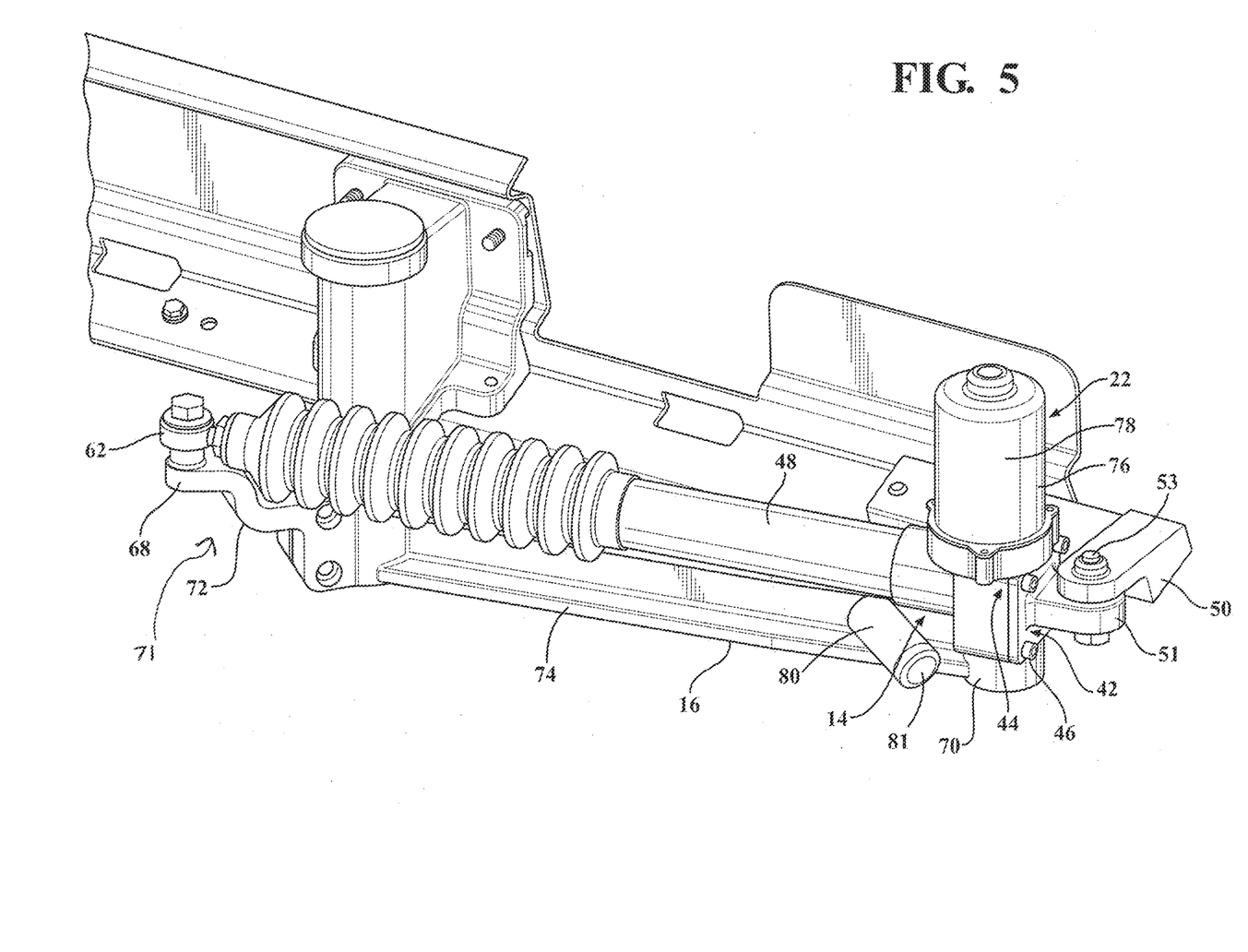
FIG. 5 is a perspective view of a housing assembly with a linear actuator assembly, a drive arm, and a motor assembly of the running board assembly.
Figure 6:
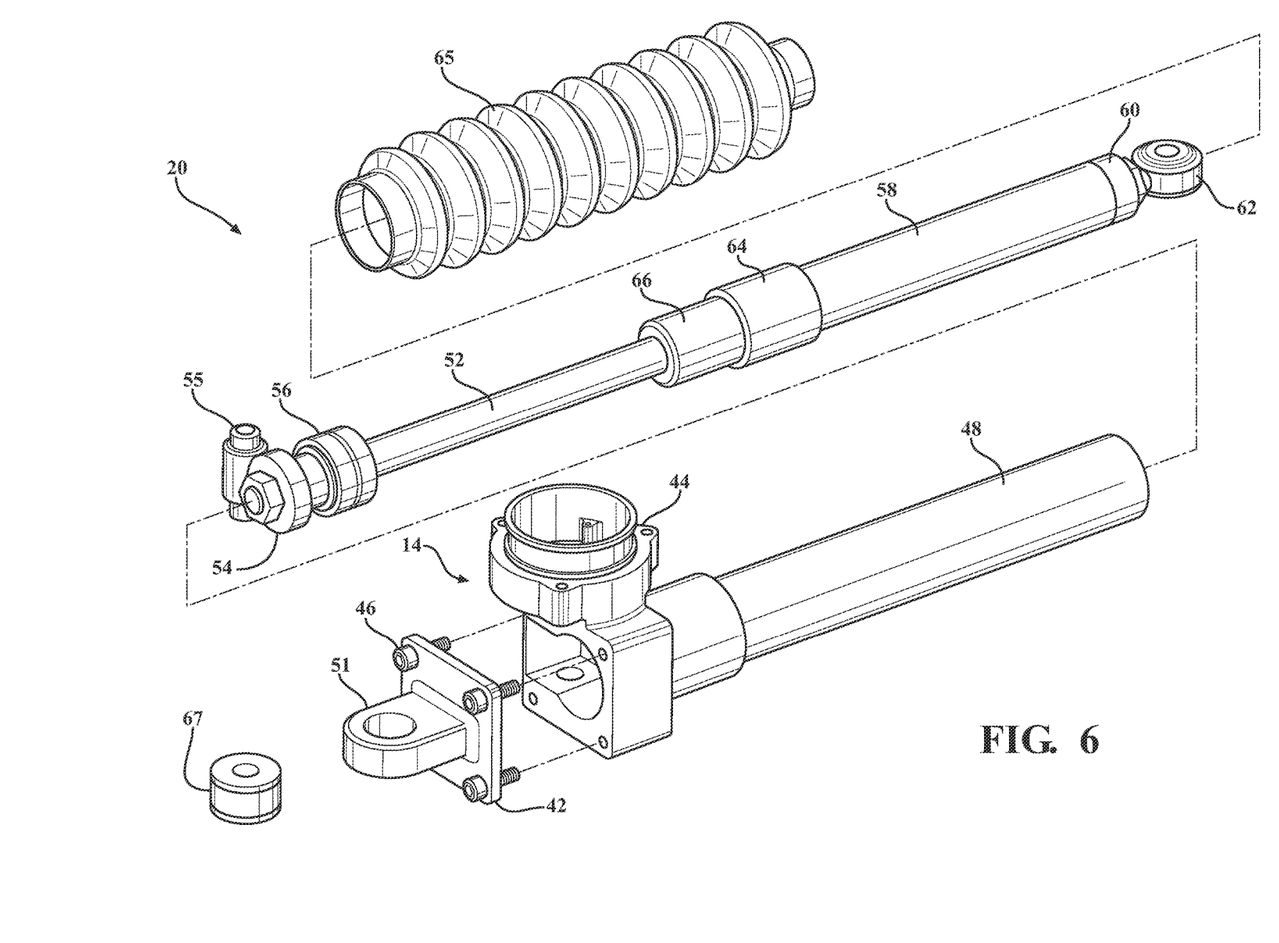
FIG. 6 is an exploded view of the linear actuator assembly of the running board assembly.

Referring to FIGS. 5 and 6, the housing assembly 14 includes a cover structure 42 and a main housing structure 44. The cover structure 42 is secured to the main housing structure 44 by a plurality of cover fasteners 46, e.g., cover screws. The cover structure 42 and the main housing structure 44 define an internal chamber within the housing assembly 14. The housing assembly 14 also includes a steel tube portion 48, a rear bracket 50, and a bracket 51 integrally formed with the cover structure 42 and having an aperture for receiving a fastener 53, e.g., nut and bolt arrangement, for securing to the rear bracket 50. Another bearing 67, e.g., spherical bearing with nitrile seals, is coupled to the bracket 51. The rear bracket 50 of the housing assembly 14 is secured to the mounting bracket 26 adapted for attachment to the frame of the motor vehicle 28.

The linear actuator assembly 20 includes a ball screw member 52 disposed within the steel tube portion 48 and rotatable relative thereto. The ball screw member 52 is operably coupled to the motor assembly 22. A worm member 54, e.g., plastic worm gear, is fixedly mounted toward an end of the ball screw member 52 for rotation therewith, and includes a lead worm self locking member, generally shown at 55, e.g., worm gear with self locking 4 degree lead angle. The worm member 54 can be of any suitable configuration. A plurality of tapered roller bearings 56, e.g., at least two, are mounted on an exterior surface of the worm member 54 and/or ball screw member 52. The linear actuator assembly 20 also includes an actuator shaft tube 58 with a tube insert 60 at one end operably coupled to a spherical bearing 62, e.g., a spherical bearing having a PTFE liner (polytetrafluoroethylene) fitted therein and fixedly secured to the bearing 62, preferably, spherical ball bearing having stainless steel ball, PTFE liner and nitrile seals. At the other end of the actuator shaft tube 58 there is provide a bearing 64, preferably, a steel/PTFE sleeve bearing, and a ball nut 66 with internal ball return for linear movement thereof. Other suitable ball returns are contemplated without departing from the scope of the invention. The ball screw 52 and ball nut 66 have matching helical grooves. Bellows 65 are operably fitted over at least the actuator shaft tube 58, ball nut 66, and bearing 64, operable for providing an environmental seal.

Ball screws are the method of choice in linear-actuation applications in accordance with the present invention. Ball screws convert rotary input to linear motion and offer several advantages over other actuators, such as Acme screws, hydraulic or pneumatic systems, and belt, cable, or chain drives. Thus, the rotation of the ball screw 52 drives pivotal movement of the drive arm 16. It is appreciated that other suitable actuators such as, but not limited to, air cylinder or hydraulic cylinder type, or other suitable linear motion screws are contemplated without departing from the scope of the invention.

It is appreciated that in one embodiment a plurality of threads may be defined on an exterior surface of the ball screw 52, in combination with operational contact with the ball nut 66 internal ball return arrangement and/or bearing 64.

Referring to FIGS. 1 and 5 generally, the drive arm 16 includes a first end 68 rotatably coupled to the spherical bearing 62 and an opposing second end 70 rotatably coupled to a second mounting bracket 73 fixedly connected to the running board 12. The drive arm 16 includes a first link 72 pivotably connected to a second link 74 at a joint 75. The rotation of the ball screw 52 drives rotation of the first link 72 and pivotal movement about the joint 75 of the second link 74 to move relative to the first link 72 causing the running board 12 to deploy between stowed and a deployed positions. The joint 75 is mounted to another hub structure 36 which pivotally secures the drive arm 16 to a second rear bracket 38. This rear bracket 38 is mounted to the mounting bracket 26 which is attached to the frame of the motor vehicle 28. The first link 72 is a rotatable extension with an offset generally shown at 71 such that when the linear actuator assembly is mounted under the vehicle, up and behind the bottom edge of the vehicle side panel, the running board is horizontally positioned under the bottom edge when in the stowed position and extends horizontally to the cab and box step positions.

Referring to FIGS. 1 and 5 through 7 generally, the motor assembly 22 includes a casing structure 76 which includes a position sensing and encoding motor 78 that rotates a shaft in opposing first and second directions. The motor assembly 22 is secured to the linear actuator assembly 20. More particularly, the shaft extends into the main housing structure 44 and is fixedly secured to the worm gear 54 coupled with the lead worm self locking member 55 such that activation of the motor 78 will rotate the self locking member 55 in the same direction causing rotation of the worm gear 54 which will cause rotation of the ball screw member 52. The casing structure 76 is secured to the main housing structure 44 by a second plurality of fasteners. It is appreciated that the casing structure 76 may in one embodiment be considered part of the housing assembly 12 as the housing assembly 12 maintains the worm gear and motor components sealed from the external environment.

Figure 7:
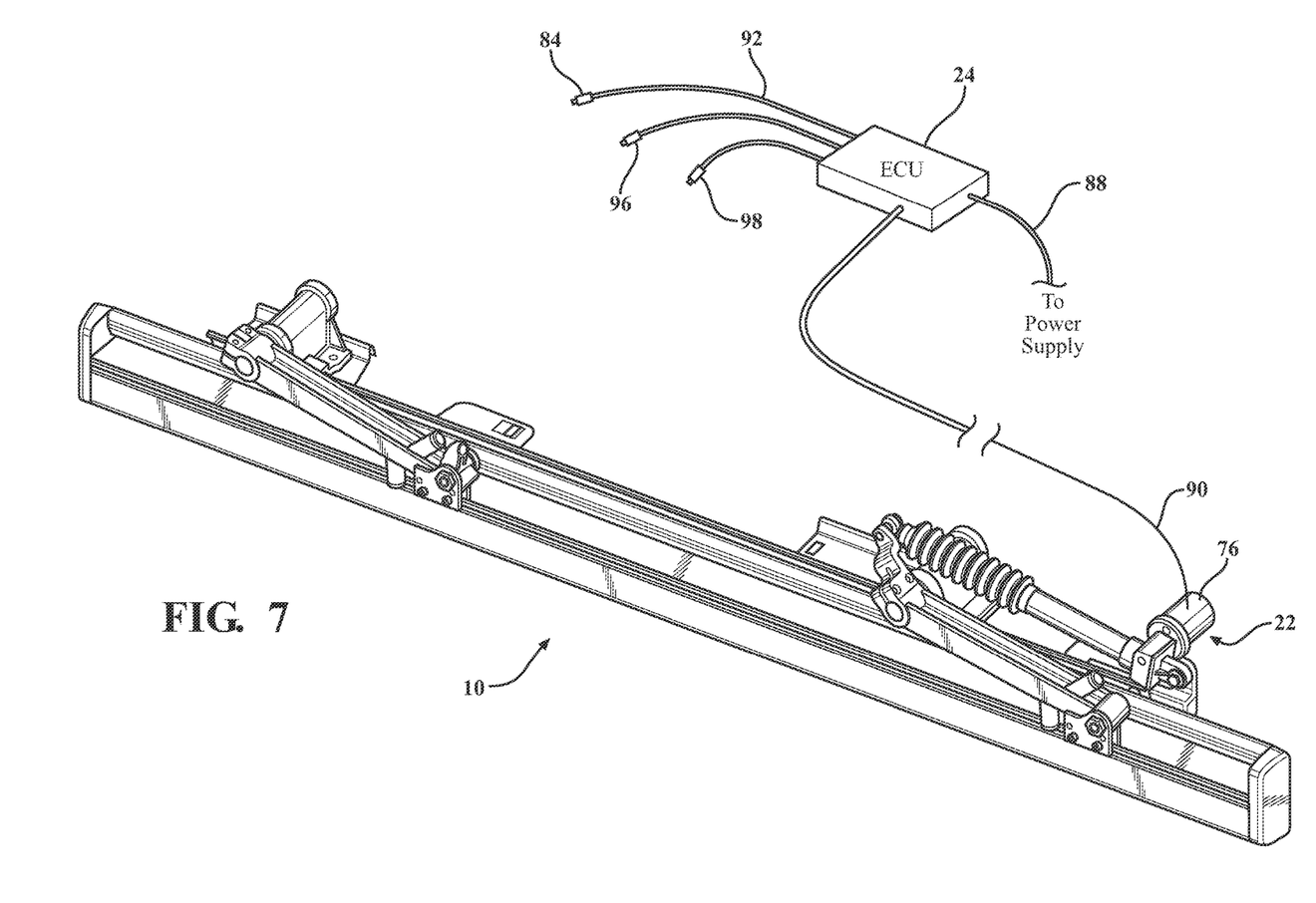
FIG. 7 is a perspective view of the running board assembly including an electronic control unit.

The electronic control unit 24 electronically controls the motor assembly 22 to effect movement of the running board 12 between the stowed, cab entry, and box side step positions. The electronic control unit 24 is mounted within the motor vehicle 28 at a location remote from the housing assembly 14. The electronic control unit 24 is electrically connected to the motor assembly 22, to a wiring harness of the motor vehicle 28, and to a switch member 84 incorporated into a door 86 of the motor vehicle 28. In another embodiment, the electronic control unit 24 may be physically mounted to the housing assembly 14 or to the motor assembly 22, and electronically connected to the motor assembly 22.

The switch member 84 in one embodiment is a door-actuated switch member that is part of the motor vehicle 28 and is controlled in a conventional manner by the door 86. The wiring harness supplies the electrical power from the vehicle electrical system to the electronic control unit 24 of the running board assembly 10 through electrical wire members 88. The structure and operation of a conventional switch member which is operationally interconnected to the vehicle door 86 is well known. It is understood by one skilled in the art that such switch members are toggled by the opening or the closing of the vehicle door 86 associated therewith to open and close an electrical circuit. Wire members 90 provide electrical connection between the electronic control unit 24 and the motor assembly 22 so that the electronic control unit 24 can supply electrical power from the vehicle electrical system to the motor assembly 22 to effect the bi-directional operation thereof. Wire members 92 provide electrical communication between the electronic control unit 24 and the door-actuated switch member 84.

In one embodiment, the switch member 84 is a door ajar switch in a door latch. The motor assembly 22 is energized to move the running board 12 from the stowed position to the cab entry position upon receiving a signal from the door ajar switch indicating that the vehicle door 86 has been opened. The motor assembly 22 is energized to return the running board 12 to the stowed position upon receiving a signal from the door ajar switch indicating that the vehicle door 86 has been closed.

The running board assembly 10 has at least one stop that is internal to the actuator and/or are external stops. It is appreciated that in one embodiment there are no external stops.

In operation, starting with the running board 12 in the stowed position, when the vehicle door 86 is unlatched and pivoted outwardly from a closed position to an open position, the switch member 84 associated with the vehicle door 86 is activated and sends a control signal to the electronic control unit 24. The electronic control unit 24 in response to the control signal supplies an appropriate voltage to the motor assembly 22 to cause the motor assembly 22 to begin rotational movement in a first rotational direction which will operably cause rotation of the ball screw member 52 to convert rotary input to linear motion thereof, thereby causing pivoting of the first link 72 relative to the second link 74 about joint 75 to move the running board 12 to the cab entry position. Specifically, the motor 78 rotates the lead worm 55 causing rotation of the worm gear 54 in a first rotational direction which in turn rotates the ball screw member 52. The actuator shaft tube 58 is rotatable with the ball screw member 52 and causes the drive arm 16 to pivot outwardly away from the motor vehicle 28 to move the running board 12 to the cab entry position. The particular location of the running board 12 in the cab entry position is electronically controlled by the motor 78. The electronic control unit 24 is programmed to stop the motor 78 after a predetermined number of armature revolution counts. As a result, the exact location of the running board 12 in the cab entry position may vary depending upon when the motor 78 is programmed to stop. When the electronic control unit 24 senses that the running board 12 has reached the cab entry position, the electronic control unit 24 turns off the motor 78.

The running board 12 is retained in the cab entry position after the motor assembly 22 is shut off as a result of at least the engagement between the worm gear 54 and the ball screw member 52, as it is known that the worm gear 54 will not be back-driven by the screw member 52. Specifically, the lead worm 55 is self locking and will not be back-driven. Thus, the lead worm 55 and/or worm gear 54 will resist an external force applied to the drive arm 16 in a direction away from the cab entry position and towards the stowed position as a result of the engagement.

The running board 12 remains in the cab entry position until the door 86 of the motor vehicle 28 is returned to the closed position. When the door 86 is pivoted inwardly from the open position to the closed position, the switch member 84 associated therewith is activated and sends a signal to the electronic control unit 24. The electronic control unit 24 in response to the signal supplies an appropriate voltage to the motor assembly 22 which will pivot the drive arm 16 to move the running board 12 to the stowed position. Specifically, the shaft of the motor assembly 22 rotates the lead worm 55 causing rotation of the worm gear 54 in a second rotational direction which in turn rotates the ball screw member 52. The actuator shaft tube 58 is rotatable with the ball screw member 52 and causes the drive arm 16 to pivot inwardly towards the motor vehicle 28 to move the running board 12 to the stowed position.

It is appreciated that in one embodiment at least two stops are located on each drive arm 16 and idler arm 18 to abut the running board 12. The drive arm 16 includes a stow stop 82 and end stop 80 formed at a location between the joint 75 and second end 70. The running board 12 abuts the stow stop 82 to stop further movement of the running board 12 when the board 12 has reached the stowed position. The running board abuts the end stop 80 when the board 12 has reached the box side step position to stop further movement of the running board 12. In one embodiment, the stow and end stops 82, 80 include bumpers 81 formed from urethane or a other suitable material. The stow stop 82 and electronic control unit 24 are used to turn off the motor 78 of the motor assembly 22. The running board 12 will continue to move towards the stowed position until the running board abuts the stow stop 82. A current spike is generated in the motor assembly 22 as a result of the motor assembly 22 meeting a resistance to movement when the running board 12 hits the stow stop 82. The current spike will be instantaneously detected by the electronic control unit 24. In response to the current spike, the electronic control unit 24 turns off the motor 78. Likewise, the running board 12 will continue to move towards the box side step position until the running board abuts the end stop 80. A current spike is generated in the motor assembly 22 as a result of the motor assembly 22 meeting a resistance to movement when the running board 12 hits the end stop 80. The current spike will be instantaneously detected by the electronic control unit 24. In response to the current spike, the electronic control unit 24 turns off the motor 78.

Figure 8:
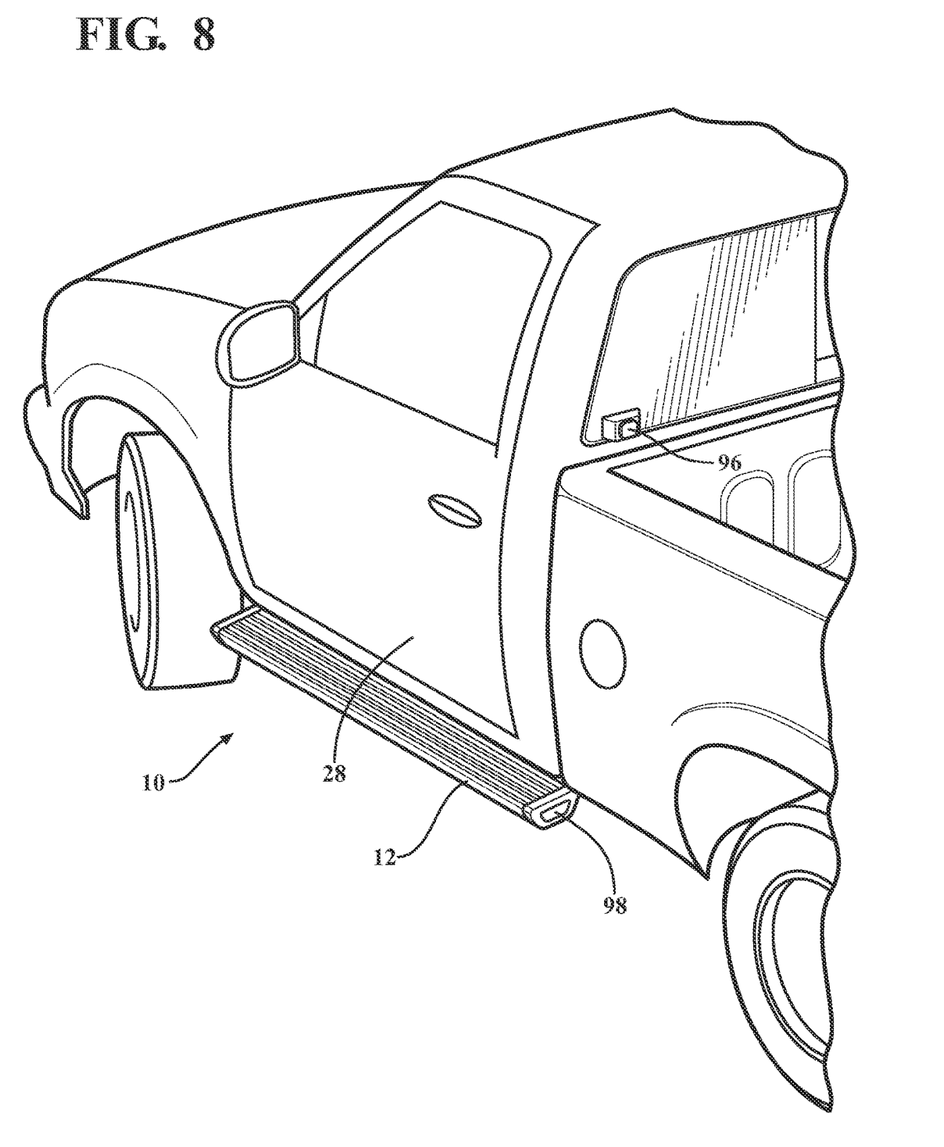
FIG. 8 is a fragmentary rear perspective view of the motor vehicle including an end cap switch and a body-mounted switch for activating movement of the running board into and out of the box side step position.

Referring to FIG. 8, the motor vehicle 28 may include an input member such as a body-mounted switch 96, an end cap switch 98, or a key fob to initiate movement of the running board 12 into and out of the box side step position. The body-mounted switch 96 and the end cap switch 98 may be electrically connected to the electronic control unit 24 by wire members 100 or by a wireless connection. The body-mounted switch 96 is easily accessible by hand and the end cap switch 98 may be accessed by a user's foot. Thus, the running board 12 may be hand-operated, or foot-operated if hands-free operation of the running board 12 is desired. The running board 12 may be moved into the box side step position from either the stowed position or the cab entry position. Upon activation of one of the switches 96, 98 or the key fob, a signal is sent to the electronic control unit 24. The electronic control unit 24 in response to the signal supplies an appropriate voltage to the motor assembly 22 to cause rotational movement in a first direction which will convert rotary input to linear motion and pivot the drive arm 16 linkages to move the running board 12 to the box side step position.

To move the running board 12 out of the box side step position and into the stowed position, the body-mounted switch 96, the end cap switch 98, or the key fob is activated which sends a signal to the electronic control unit 24. The electronic control unit 24 in response to the signal supplies an appropriate voltage to the motor assembly 22 to cause rotational movement in a second rotational direction which will convert rotary input to linear motion and pivot the drive arm 16 linkages to move the running board 12 to the to the stowed position. Specifically, the motor shaft of the motor assembly 22 rotates the lead worm 55 causing rotation of the worm gear 54 in a second rotational direction which in turn rotates the ball screw member 52. The actuator shaft tube 58 rotates with the ball screw member 52 and causes the drive arm 16 to pivot inwardly towards the motor vehicle 28 to move the running board 12 to the stowed position. The running board 12 reaches the stowed position when the running board 12 abuts the stow stop 82 on the drive arm 16. A current spike is generated in the motor assembly 22 as a result of the motor assembly 22 meeting a resistance to movement when the running board 12 hits the stow stop 82. The current spike will be instantaneously detected by the electronic control unit 24. In response to the current spike, the electronic control unit 24 turns off the motor 78. It is further contemplated that in the alternative the running board 12 may be moved from the box side step position to the cab entry position. It is appreciated that in one embodiment the stops for linear actuation are internal without any external stops.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A running board assembly for a motor vehicle having a passenger cab and a box, said running board assembly comprising:
   at least one mounting bracket adapted for attachment under the motor vehicle;
   a housing assembly;
   a linear actuator assembly partly disposed within said housing assembly;
   a running board operably coupled to said linear actuator assembly and movable relative to said housing assembly between a stowed position tucked underneath the motor vehicle, a cab entry position generally horizontally outwardly from the stowed position to support a user entering or exiting the passenger cab, and a box side step position disposed generally horizontally outwardly from the stowed position and rearward of said cab entry position to provide a user with side access to the box, wherein said cab entry position is between said stowed position and said box side step position;
   a drive arm operably pivotally connected to said linear actuator assembly and operably pivotably connected to said running board, said drive arm including an offset for allowing mounting under the motor vehicle and horizontally extending the running board outwardly from underneath the motor vehicle; and,
   a motor operably coupled to said linear actuator assembly for driving said linear actuator assembly in opposing first and second directions to move said running board horizontally between said stowed position, said cab entry position, and said box side step position.

2. The running board assembly according to claim 1, wherein said drive arm being operably coupled to said linear actuator assembly and said running board for pivotally moving said running board between said stowed, cab entry, and box side step positions.

3. The running board assembly according to claim 2, wherein said linear actuator assembly includes a rotatable ball screw member operably coupled to said motor, and wherein rotation of said ball screw member drives pivotal movement of said drive arm.

4. The running board assembly according to claim 3, wherein said drive arm includes a first link pivotably connected to a second link at a joint, wherein said first link provides the offset of the drive arm, and wherein rotation of said ball screw member drives relative movement of said first link and second link for pivotally moving said running board between said stowed, cab entry, and box side step positions.

5. The running board assembly according to claim 3, wherein said housing assembly includes a tube portion and said ball screw member is disposed within said tube portion.

6. The running board assembly according to claim 5, wherein said linear actuator assembly includes a worm member and self locking member operably coupled toward one end of said ball screw member and disposed within said housing assembly.

7. The running board assembly according to claim 6, wherein said linear actuator assembly includes a ball nut operably connected to said ball screw member with internal ball return.

8. The running board assembly according to claim 7, wherein said linear actuator assembly further comprises an actuator shaft tube operably coupled to said ball screw member, and, at a second end to a spherical bearing, said spherical bearing pivotably connected to said first link of said drive arm.

9. The running board assembly according to claim 2, wherein said drive arm includes a stow stop engageable with said running board to stop said running board in said stowed position and an end stop engageable with said running board to stop said running board in said box step side position.

10. The running board assembly according to claim 1, including an electronic control unit operably coupled to said motor and electronically controlling operation thereof.

11. The running board assembly according to claim 10, wherein said electronic control unit is programmed to turn off said motor after a predetermined number of armature revolutions to stop said running board in said cab entry position.

12. A running board assembly for a motor vehicle having a passenger cab and a box, said running board assembly comprising:
   a housing assembly with a linear actuator assembly operably mounted up under said motor vehicle;

a running board operably coupled to said linear actuator assembly and horizontally movable between a stowed position tucked underneath the motor vehicle, a cab entry position generally outwardly from the motor vehicle to support a user entering or exiting the passenger cab, and a box side step position disposed generally outwardly from the motor vehicle and rearward of said cab entry position to provide a user with side access to the box;

a drive arm fixedly secured to said running board and operably coupled to said linear actuator assembly, said drive arm including a first stop engageable with said running board to stop said running board in said stowed position and a second stop engageable with said running board to stop said running board in said box step side position, wherein said drive arm including an offset for allowing mounting under the motor vehicle and horizontally extending the running board outwardly from underneath the motor vehicle;

a motor operably coupled to said linear actuator assembly for driving said drive arm to pivotally move said running board horizontally between said stowed position, said cab entry position, and said box step side position; and an electronic control unit operably coupled to said motor and programmed to turn off said motor after a predetermined number of armature revolutions to stop said running board in said cab entry position.

13. The running board assembly according to claim 12, further comprising a switch member transmitting a signal to said electronic control unit to move said running board between said stowed and cab entry positions upon the opening and closing of a motor vehicle door.

14. The running board assembly according to claim 12, further comprising a switch member electronically connected to said electronic control unit and providing a signal thereto for moving said running board into and out of said box side step position.

15. A running board assembly for a motor vehicle having a passenger cab and a box, said running board assembly comprising:

a mounting bracket adapted for attachment of the running board assembly under the motor vehicle;

a running board movable relative to said mounting bracket between a stowed position tucked horizontally underneath the motor vehicle, a cab entry position disposed generally horizontally outwardly from the motor vehicle to support a user entering or exiting the passenger cab, and a box side step position disposed generally horizontally outwardly from the motor vehicle and generally rearward to said cab entry position to provide a user with side access to the box;

a motor operably coupled to said running board for driving movement thereof;

an electronic control unit electronically connected to said motor, said electronic control unit selectively programmable to turn off said motor to stop said running board in said cab entry position;

a housing assembly with a linear actuator assembly partly disposed therein and including a rotatable worm member and a lead worm that is self locking operably coupled to said motor, said housing assembly including a steel tube portion for receiving a rotatable ball screw member of said linear actuator assembly that is operably coupled to said worm member, said linear actuator assembly coupled to said motor for driving said linear actuator assembly in opposing first and second directions to move said running board horizontally between said stowed position, said cab entry position, and said box side step position; and a drive arm pivotably connected to said linear actuator assembly and operably coupled to said running board, said drive arm including an offset for allowing mounting under the motor vehicle and horizontally extending the running board outwardly from underneath the motor vehicle.

16. The running board assembly according to claim 15, further comprising a switch member electronically connected to said electronic control unit and providing a signal thereto for moving said running board into and out of said box side step position.

17. The running board assembly according to claim 15, wherein said drive arm being operably coupled to said linear actuator assembly and said running board operable for pivotally moving said running board between said stowed, cab entry, and box side step positions.

18. The running board assembly according to claim 17, wherein said drive arm includes a first link pivotably connected to said linear actuator and pivotably connected to a second link at a joint, wherein said first link provides the offset of the drive arm, said second link pivotably connected to said running board, wherein rotation of said ball screw member drives relative movement of said first link and second link for pivotally moving said running board between said stowed, cab entry, and box side step positions.

19. The running board assembly according to claim 18, wherein said joint is pivotably connected to a hub structure pivotably securing said drive arm to said mounting bracket.

20. The running board assembly according to claim 18, further comprising a second mounting bracket fixedly connected to said running board, said second link rotatably coupled to said second mounting bracket, wherein said second mounting bracket is located opposite the motor when the running board is in the stowed position.

21. The running board assembly according to claim 18, wherein contracting the linear actuator assembly causes said first link to rotate resulting in pulling said second link causing said running board to rotate outward to the cab entry and box side step positions.

22. The running board assembly according to claim 17, wherein said drive arm includes a first stop engageable with said running board to stop said running board in said stowed position and a second stop engageable with said running board to stop said running board in said box step side position.

23. The running board assembly according to claim 15, wherein said linear actuator assembly is located above said drive arm during outward horizontal rotation of said running board.

24. The running board assembly according to claim 15, wherein said linear actuator assembly is mounted under the vehicle by the at least one mounting bracket, upward and behind the bottom edge of the vehicle panel, while the running board is positioned under the bottom edge of the vehicle panel when in the stowed position.

* * * * *